US00H002063H

(19) United States

(12) Statutory Invention Registration (10) Reg. No.: US H2063 H

Halsey et al. (43) Published: May 6, 2003

(54) THERMAL BARRIER AND METHOD OF USE

(75) Inventors: Carl C. Halsey, Inyokern, CA (US); George P. Dixon, Ridgecrest, CA (US)

(73) Assignee: The United States of America as represented by the Secretary of the Navy, Washington, DC (US)

(21) Appl. No.: 09/524,400

(22) Filed: Mar. 13, 2000

(51) Int. Cl.[7] ..... E04C 2/00

(52) U.S. Cl. ..... 52/232; 52/309.17

(58) Field of Search ..... 106/694, 692, 106/672, 675, 679, 698, 688, 691; 52/309.12, 309.17, 404.1, 405.1, 506.02, 784.11; 428/323, 332, 325, 432, 469, 702

(56) References Cited

U.S. PATENT DOCUMENTS

| | | | | |
|---|---|---|---|---|
| 3,768,430 | A | * | 10/1973 | Moore |
| 4,084,363 | A | * | 4/1978 | Moore |
| 4,231,884 | A | | 11/1980 | Dorius |
| 4,259,824 | A | | 4/1981 | Lopez |
| 4,567,705 | A | | 2/1986 | Carlson |
| 4,641,470 | A | | 2/1987 | Baumberger |
| 4,803,107 | A | | 2/1989 | Knowles |
| 5,034,160 | A | | 7/1991 | Kindt et al. |
| 5,158,173 | A | | 10/1992 | Halsey et al. |
| 5,160,468 | A | | 11/1992 | Halsey et al. |
| 5,228,914 | A | | 7/1993 | Miceli |
| 5,440,846 | A | | 8/1995 | Record |
| 5,556,578 | A | | 9/1996 | Berneburg et al. |
| 5,749,964 | A | | 5/1998 | Mann |
| 5,759,260 | A | | 6/1998 | Groh |
| 5,860,268 | A | | 1/1999 | McWilliams |
| 5,875,607 | A | | 3/1999 | Viohra |

* cited by examiner

*Primary Examiner*—Michael J. Carone
*Assistant Examiner*—M. Thomson
(74) *Attorney, Agent, or Firm*—Earl H. Baugher, Jr.; Laura R. Foster

(57) ABSTRACT

A thermal barrier fabricated from pumice, or pumice-like material, and a suitable binder is provided. It may be formed as a self-supporting or load-bearing structural member, or as a thick coating for IR signature reduction. A first embodiment may be used to build a structure, e.g., a room onboard a ship that serves as an effective thermal barrier. Should a fire start in the room, the thermal barrier prevents rapid spreading of the fire and provides crews additional time to fight the fire. A second embodiment, as a thick coating, reduces the IR signature of a radiating body, such as an exhaust stack, by a factor of four. This thick coating helps shield an object from IR surveillance devices or seekers, resulting in much shorter acquisition and tracking times for these IR devices and seekers. In addition to benefits as a thermal barrier, structural members using concepts disclosed for this invention may provide inherent blast and shock resistance.

20 Claims, 6 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

THERMAL BARRIER AND METHOD OF USE

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The present invention pertains to a robust thermal barrier suitable for use as a structural member or as a coating. In particular, a first configuration may be a self-supporting or load-bearing wall of a structure, e.g., a room in a ship. A second configuration may be a surface coating for energy conservation or reducing the infrared (IR) signature of an object.

BACKGROUND

Today's navies are operating with reduced crews that are being asked to respond to emergencies with the same efficiency as the larger crews of the past. This impacts the ability to protect resources, especially given that some of the crew has been replaced with additional high explosive ordnance, increasing the volume susceptible to hostile action or catastrophic accidents. Additionally, new and retrofit shipbuilding is being scrutinized for implementation of cost saving initiatives, to include impact on life cycle costs. A solution that reduces operational risk as well as capital investment and maintenance expense is needed. In the recent past, pumice has been used as part of a technological solution to enhance the U.S. Navy's mission readiness by providing an effective barrier against sympathetic detonation of weapons stored in magazines and transport containers. The natural characteristics of a pumice-based barrier include both shock absorption and thermal insulation as discussed in more detail below. Of course, other materials, natural or man-made, with properties similar to pumice may be substituted.

Pumice used for construction often is mixed with Portland cement, water, and other additives to provide desirable attributes of weatherproofing, appearance, and water and wear resistance. See U.S. Pat. No. 5,759,260, *Method for Using Lightweight Concrete for Producing a Combination Therefrom and a Combination Produced Thereby,* issued to Groh, Jun. 2, 1998. A common use of lightweight materials, such as pumice, is for production of pre-formed panels or other structures. See U.S. Pat. No. 5,440,846 (panel with insulated core), *Construction for Building Panels and Other Building Components,* issued to Record, Aug. 15, 1995; U.S. Pat. No. 4,567,705 (panel for fire protection), *Fire Protection Arrangement and Method for Positioning Same,* issued to Carlson, Feb. 4, 1986; and U.S. Pat. No. 4,259,824 (panel with some inherent insulative property), *Precast Concrete Modular Building Panel,* issued to Lopez, Apr. 7, 1981. Another use of lightweight materials is for smaller building components such as construction blocks. See U.S. Pat. No. 4,641,470, *Construction Element,* issued to Baumberger, Feb. 10, 1987 in which a block of lightweight materials, having cavities cast therein, has the cavities filled, in a second step, with insulating materials.

Applying commonly used construction materials in formulation of the material's mixture and the resultant structure assures local availability and an inherent confidence in the product since the builder is familiar with the performance of known materials. See U.S. Pat. No. 5,860,268, *Light-Weight Concrete Door,* issued to McWilliams, Jan. 19, 1999 in which a metal frame, wire mesh, hinges, and wooden molds, all common construction material, are combined with a concrete mix and a novel air entrainment admixture. . See U.S. Pat. No. 5,875,607, *Low-Cost Exterior Insulation Process and Structure,* issued to Vohra, Mar. 2, 1999, in which bags of insulating material that may contain pumice as part of the mix, are placed against existing exterior walls, connected to the wall, covered with stucco wire, and stuccoed for a finished surface.

Should one wish to particularly exploit a particular characteristic of material having the properties of pumice as used in a building material, one needs to carefully select a binder, and method of application of the binder, in order to optimize that characteristic. One such desirable characteristic of a pumice-like material is its resistance to conducting heat, in particular, high heat.

When exploiting a number of desirable characteristics of pumice, however, no one characteristic is likely to be optimized. See U.S. Pat. No. 4,231,884, *Water Retardant Insulation Composition Comprising Treated Low Density Granular Mineral Material and Finely Divided Limestone or Similar Carbonate or Silicate Mineral Particles and Method for Using Same,* issued to Dorius, Nov. 4, 1980. The '884 patent provides an insulative composition that is also a water retardant, a corrosion preventative, and capable of use in building a load-bearing wall. To accomplish all of these objectives, certain additional coatings are provided for the lightweight inorganic material. As well, the physical composition of the mixture is adjusted to accommodate each objective. No one objective is being optimized in the mixture.

Pumice has been used for the fabrication of refractory materials. See U.S. Pat. No. 5,228,914), *Pumice Containing Composition,* issued to Miceli, Jul. 20, 1993 (a mixture of crushed pumice, calcium aluminate, glass fibers and water for use in ovens, heaters, and other high-temperature applications). For this application, the precise makeup of the mixture must be followed to attain the refractory material, an important ingredient being calcium aluminate.

Pumice, in combination with a binder of cement, such as PORTLAND cement, and water, and other optional ingredients such as volcanic ash, scoria, vermiculite, mineral wool and even kerosene, was used to create an insulative thermal barrier. See U.S. Pat. No. 4,803,107, *Light Weight Thermal Insulation Material Product and Process,* issued to Knowles, Feb. 7, 1989. Again, the product resultant from the above process was intended to address a number of objectives such as water retardation, the "R-factor" of the product for use in residences, and structural strength. Further, pumice comprised less than twenty percent of the mixture so that objectives other that fire retardation could be addressed by the product.

Aggregates of inorganics have also been an ingredient in coatings that may be applied by spraying, brushing, rolling, troweling, or using generally accepted stuccoing methods. See U.S. Pat. No. 5,556,578, *Aggregate Containing Hydration Water in Spray Applied Fireproofing,* issued to Bemeburg et al, Sep. 17, 1996 and U.S. Pat. No. 5,034,160, *Sprayable Fireproofing Composition,* issued to Kindt et al, Jul. 23, 1991. The '578 patent describes a slurry for spraying on structural components, such as steel beams, to provide a flame-retardant surface. The slurry comprises a cementitious binder, such as PORTLAND cement and water, and a hard aggregate having hydration water, such as bauxite, together with optional additives, such as shredded polystyrene aggregate and starches, to aid application. The '160 patent describes a multi-element composition suitable for use as a sprayed-on coating. The composition includes a cementitious binder such as PORTLAND cement and water, a porous aggregate that could include pumice, a fibrous material, an air-entraining agent, and a rheopectic (a fluid mixture that, when subjected to a shear force, increases in viscosity) agent. Both the '578 patent and the '160 patent are directed to a solution of the problem of pumping the mixture over large distances, e.g., the upper floors of high-rise buildings and, as such, are addressing a number of competing objectives.

Optimizing the use of pumice-like material for construction may key on the attributes of strength, cost, appearance, and ease of application with little or no attention paid to thermal conduction. A carefully crafted mixture, optimized for performance as a thermal barrier, may not meet one or more of the above requirements for general construction. In fact, this "carefully crafted" mixture may have been considered and subsequently rejected because it did not meet the builder's more immediate objectives.

As noted above, pumice has been used as an ingredient in construction materials where a lightweight substitute for concrete or adobe has been called out in specifications. It has also been used for packing around explosives to preclude sympathetic detonation of a neighboring explosive should one of a package be detonated. See U.S. Pat. No. 5,158,173, *Weapons Storage Container to Prevent Sympathetic Detonation of Adjacent Weapons,* issued to Halsey et al, Oct. 27, 1992, incorporated herein by reference in particular to the shock and blast resistance of pumice barriers, and U.S. Pat. No. 5,160,468, *Method for Preparing a Storage Container for Explosive Rounds,* issued to Halsey et al, Nov. 3, 1992, incorporated herein by reference in particular to the shock and blast resistance of pumice barriers. Further, there exist any number of methods to provide a separate insulation barrier, examples of which are the '607 patent and the '884 patent.

Combining pumice-like material with a suitable binder for pouring into forms for making, in a single process, a thermal barrier with structural integrity has not been perfected prior to this invention.

SUMMARY OF THE INVENTION

A preferred embodiment of the present invention comprises a mixture of pumice or pumice-like particles and a binder, whereupon said mixture is either poured into a form, with optional reinforcement, for fabricating a structure or applied as a coating. The binder can be any of a number of suitable admixtures, including, but not limited to, a Portland cement; a plaster; an epoxy; a resin, including a polyester or epoxy resin; and a polymer binder, or a combination of the above.

In one preferred embodiment, the pumice or pumice-like particles are of a size between ¼" (0.63 cm) and ⅜" (0.94 cm) and the epoxy is a commercially available two-part epoxy. This mixture is poured into forms much like concrete forms but not requiring the same strength since the material is much lighter than concrete. It can be poured into forms positioned horizontally, vertically, or any angle in between. It can also be poured into forms enclosing non-traditional shapes, such as ogives, truncated pyramids, cylinders, and irregular shapes to enclose odd-shaped devices such as gun turrets or boilers with accompanying ductwork and piping. Because of the relatively low density of the material, lightweight removable partitions or panels can be formed from it, facilitating modification or maintenance work.

In a second preferred embodiment, a mixture of pumice or pumice-like particles and binder is used to coat heat emitting devices in order to conserve heat or reduce the infrared signature of the device, or both. This coating may serve as a replacement for asbestos barriers now subject to strict environmental regulations.

Although the same size particles may be used in the coating mixture as for forming a structural member, ease of application may call for the use of smaller particles on the order of ⅛" or smaller. However, it is beneficial to maintain a minimum particle size. The insulation value of this thermal barrier depends on formation of air spaces, or voids, between the particles. Since the particles do not pack tightly, one surface mating exactly with another, these voids are an inherent consequence of forming such a coating. This coating may be applied to any surface, including those of irregular conformation and texture. Optionally, a first adhesive layer may be needed to insure proper adhesion of the mixture to the surface. Material to coat such an adhesive layer is selected based on the materials content and conformation of the surface to be coated.

Advantages of preferred embodiments of the present invention, include:

- dual use fabrication as a structural member and a thermal barrier;
- high weight percent of naturally heat resistant material;
- lightweight, high strength substitute for concrete;
- able to be formed into any shape;
- increased fire resistance, lowering operating costs and risks;
- reduced fire insurance rates;
- simplified design of alternate configurations;
- inexpensive fabrication;
- reduced system complexity requiring a single member to serve multiple functions;
- environmentally friendly, using natural materials and suitable for use with
- the most environmentally compliant binders;
- able to be sprayed, brushed, rolled, troweled, or applied as a stucco to any surface;
- impervious to sporadic water damage;
- reduced system capital costs;
- increased operational readiness;
- low maintenance costs;
- increased flexibility;
- high reliability;
- particularly suitable for renovations and modifications; and
- readily applied as a coating to existing structures and objects.

Embodiments of the present invention can be applied to land, sea, or airborne vehicles or fixed facilities. Incorporating the invention into a design saves capital as well as operations and maintenance costs. Further, a preferred embodiment of the present invention may be used anywhere in the world that common building practices are followed.

Preferred embodiments are fully disclosed below, albeit without placing limitations thereon.

BRIEF DESCRIPTION OF DRAWINGS

1.

2.

3.

4.

5.

6.

7.

DETAILED DESCRIPTION

Figure 1A:
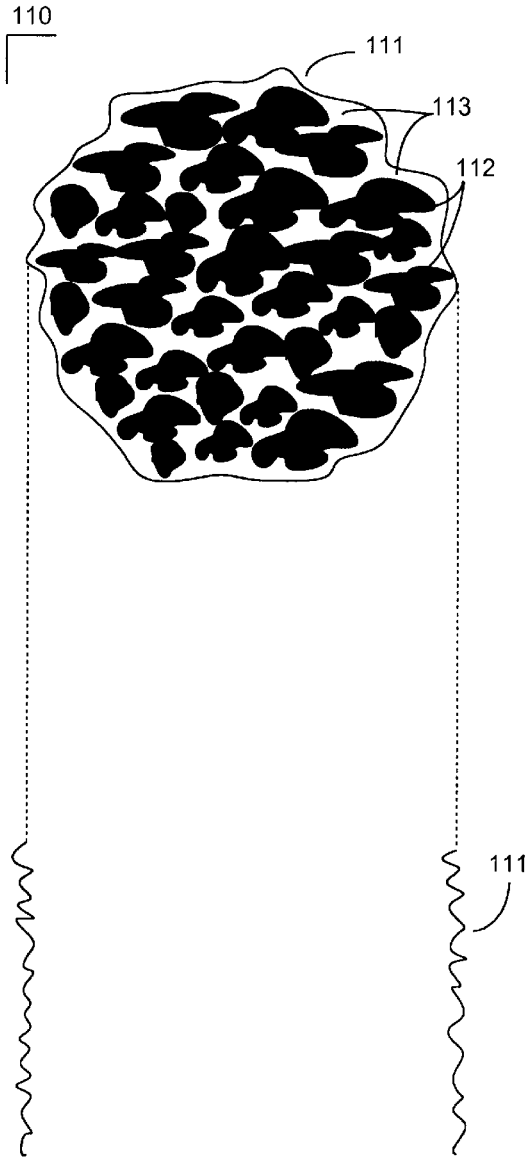
FIGS. 1A and 1B offer a comparison of a preferred embodiment of the present invention to an aggregate composition used in common construction applications.
Figure 1B:
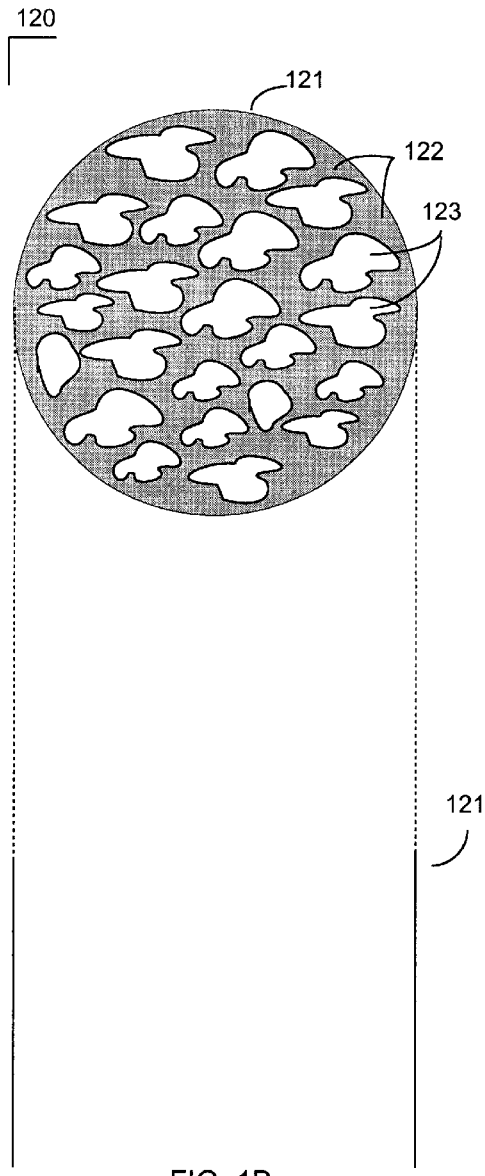
FIG. 1B (Prior Art)

Refer to FIG. 1. FIG. 1A depicts a top view and projected side view of a solid cylinder 110 as fabricated for a preferred embodiment of the present invention. The pumice or pumice-like particles indicated by the darkened areas 112 represent thinly-coated particles as joined by a binder used in a preferred embodiment of the present invention. The light areas 113 represent voids in the structure. These voids are air gaps. The projected side view shows the irregular surface 111 resulting from molding or casting a mixture of a preferred embodiment of the present invention into a solid cylinder, the cylinder being bound together by the thin coating of binder applied to each particle, a bond occurring only at the location each coated particle physically touches another particle. Compare this to FIG. 1B (Prior Art).

FIG. 1B shows a solid cylinder 120, representative of prior art, similar in size and shape to the solid cylinder of FIG. 1A. The solid cylinder 120 also is comprised of aggregate particles 123 and a binder 122. The binder 122 completely fills the voids between the aggregate particles 123 such that there are no voids (air gaps) like the voids 113 of FIG. 1A. Further, the "finished" surface 121 of the cylinder, as shown in both a top view and a side view is smooth (when viewed from a macro aspect) as compared to the solid cylinder 110 and its irregular surface 111 of FIG. 1A.

It is this provision for voids or air gaps, that provides a preferred embodiment of the present invention with properties that result in an excellent thermal barrier that also has sufficient structural strength for use as self-supporting or load-bearing structural members, with or without added reinforcement elements. Because a mixture of a preferred embodiment of the present invention can be applied as a coating, it is possible to retrofit existing systems or even use it as a supplement to conventional construction methods. For the initial coating to properly adhere to certain surfaces, additional adhesives or agents may have to be applied to the surface to be coated with a preferred embodiment of the present invention's mixture, or incorporated in the mixture for the first coating.

In one embodiment of the present invention, the binder is selected to thinly coat pumice or pumice-like material crushed to a uniform size of about ¼"–⅜" (0.635 cm –0.95 cm) in the longest dimension, for subsequent placement in a form suitable for fabricating a structural member. This thin coating may be applied in a thickness from about 0.004" (0.1 mm)–0.04" (1.0 mm). The form may also have placed therein reinforcing material such as a steel mesh, "rebar," or any number of polymer compounds suitable as a reinforcing agent. After curing, the mixture forms a "unitized" structural member of a thermal barrier.

Figure 2:
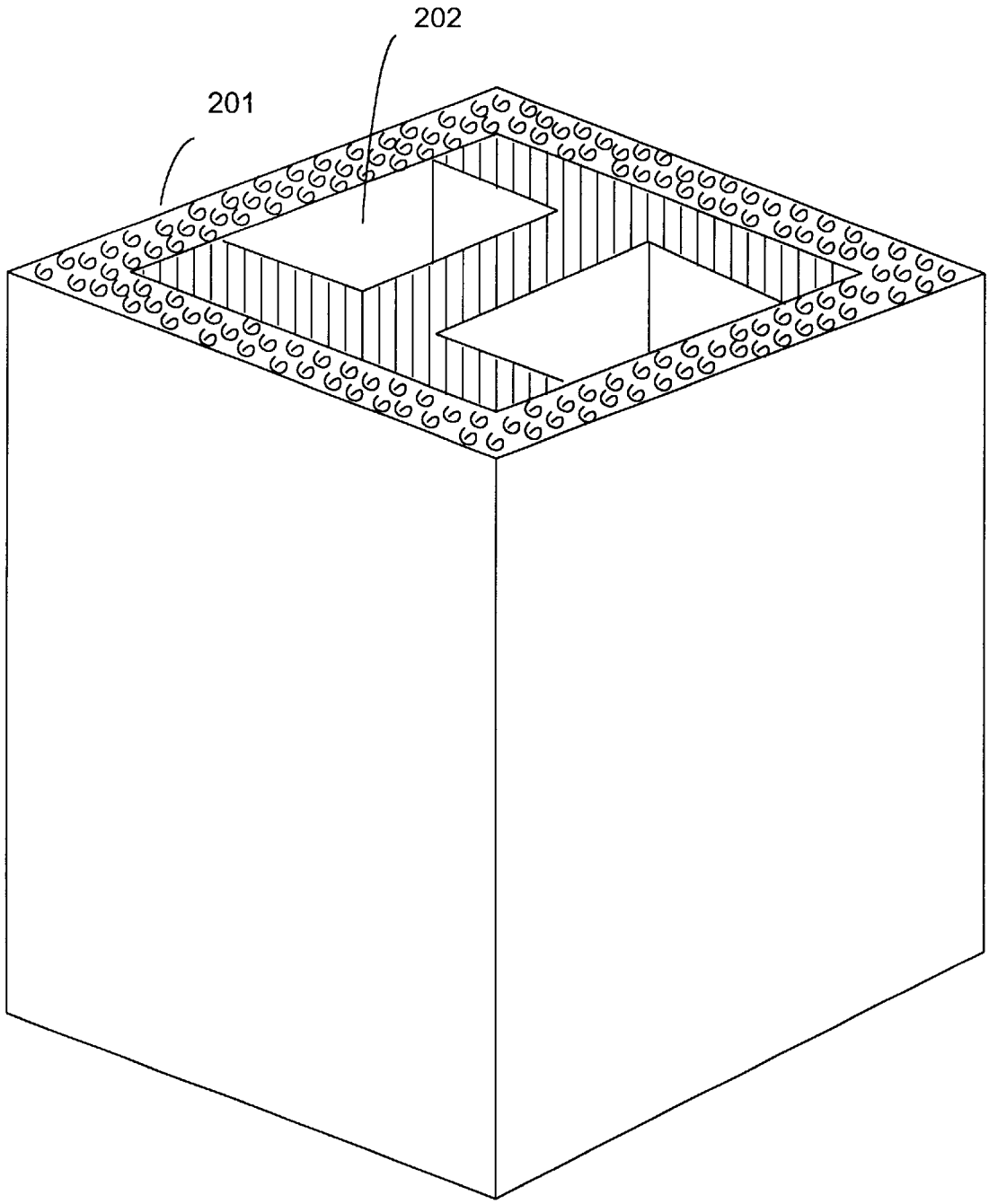
FIG. 2 depicts a preferred embodiment of the present invention as a coating over a typical flue for a two-element stack.

Refer to FIG. 2. FIG. 2 shows a thick coating 201 of a preferred embodiment of the present invention enveloping a conventional two-part flue 202. This coating utilizes pumice or pumice-like particles of a uniform size, perhaps of a smaller size than what would be used for a structural member, e.g., ⅛"–¼" (0.32 cm –0.635 cm), and perhaps a different binder with more solvents to assure an even flow, e.g., a polymeric resin. To summarize, this second embodiment employs a highly viscous mixture for coating existing surfaces, such as exhaust stacks, doors, and portable generators for the military.

In general, a thermal barrier using a preferred embodiment of the present invention is fabricated using a porous aggregate comprising uniform pumice or pumice-like particles of ¼"–⅜" and a two-part slow-curing epoxy. The epoxy and aggregate are mixed, e.g., by tumbling, resulting in a thin epoxy coating on each aggregate particle. The mixture is poured into a form or casting and sets up as a porous solid. Upon setting, only the contacting surfaces of the individual aggregate particles are joined, leaving considerable voids (air gaps) in the product, yielding a very porous structural member.

This particular fabrication method yields benefits in addition to the efficient production of a characteristically porous structural member. First, the amount of epoxy required to just adhere adjoining surfaces of aggregate particles is considerably less than that required to produce an impervious or non-porous solid by filling the voids with binder. This reduces fabrication costs considerably. Second, the voids within the structural member make for a much lighter member, an especially important design consideration when installation on a vehicle or waterborne vessel is the goal. Third, the voids enhance the insulative property of the structural member, trapped air being a major contributor thereto. Fourth, the porous material is better able to withstand the effects of shock and blast, as compared to a structural member with smaller or no voids. Note that the very benefits for which this embodiment is being touted may well make it unsuitable for use in an environment where water resistance or wear may be a controlling factor.

Although a two-part epoxy has been used in the above example, other binders are suitable given that a thin complete coating of the aggregate particles can be effected without a subsequent filling of the voids (pores). The final environment in which the barrier will be used will dictate both the type of binder and any additional agents or structural reinforcement needed.

Figure 3:
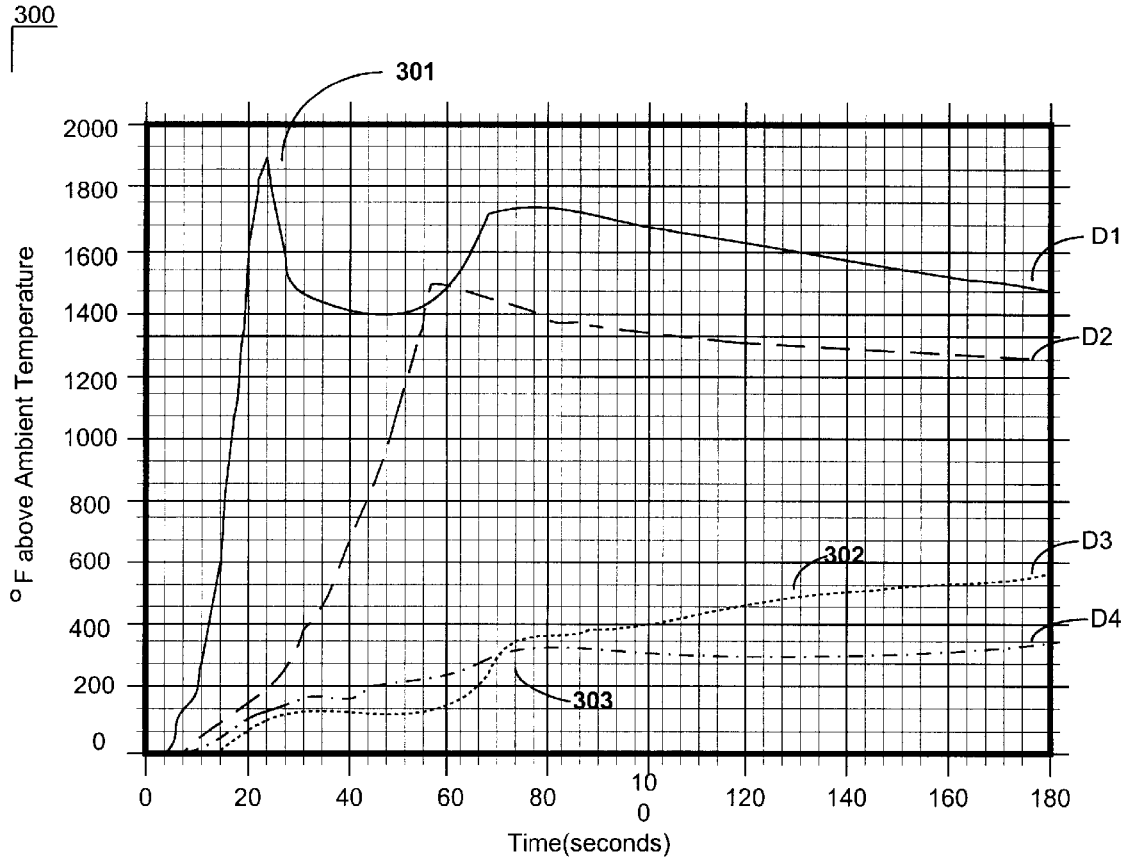
FIG. 3 is a graph of flame test results for a preferred embodiment of the present invention.

A test of a sample block, fabricated as a thermal barrier from a two-part epoxy and ¼"–⅜" pumice, was conducted. Thermocouples were embedded at several depths within a block approximately 12"×4"×4". Four thermocouples were placed at depths of 1", 2", 3", and on the other side of the block (4") from the flame applied by an oxyacetylene cutting torch. Results are shown in FIG. 3 as D1, 1"; D2, 2"; D3, 3"; and D4, 4" displacement 300. The heat from the torch peaked 301 at about 1925° F. (1050° C.) at the 1" depth D1 but at the 3" depth D3 the temperature leveled off 302 at about 550° F. (290° C.) after three minutes while at the 4" depth D4 the temperature quickly stabilized 303 at 330° F. (185° C.) after about one minute and remained at that level for the next two minutes of the test.

Figure 4A:
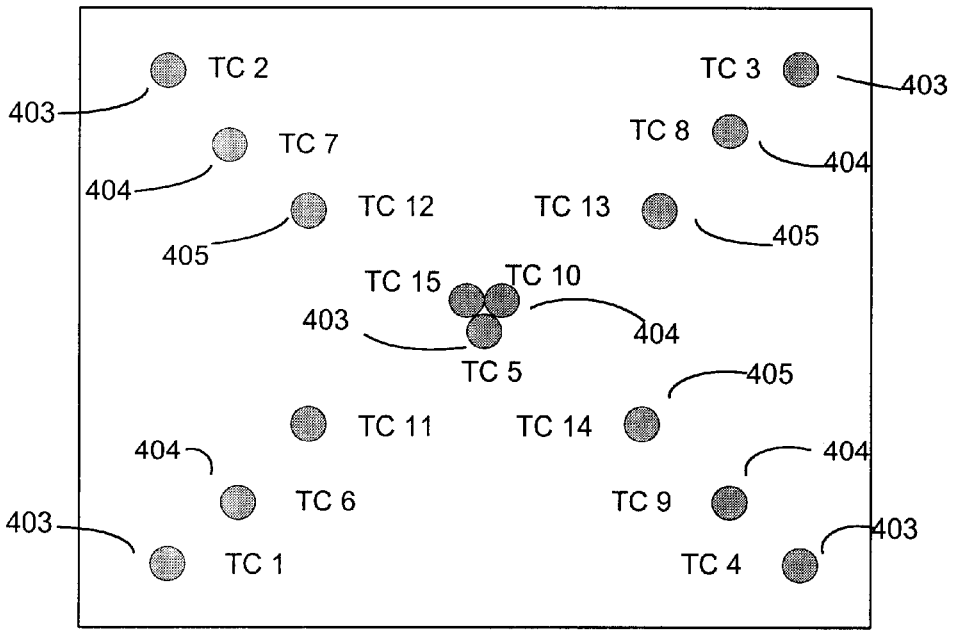
FIG. 4A depicts locations of internal thermocouples used in a flame test of a container protected by a preferred embodiment of the present invention.
Figure 4B:
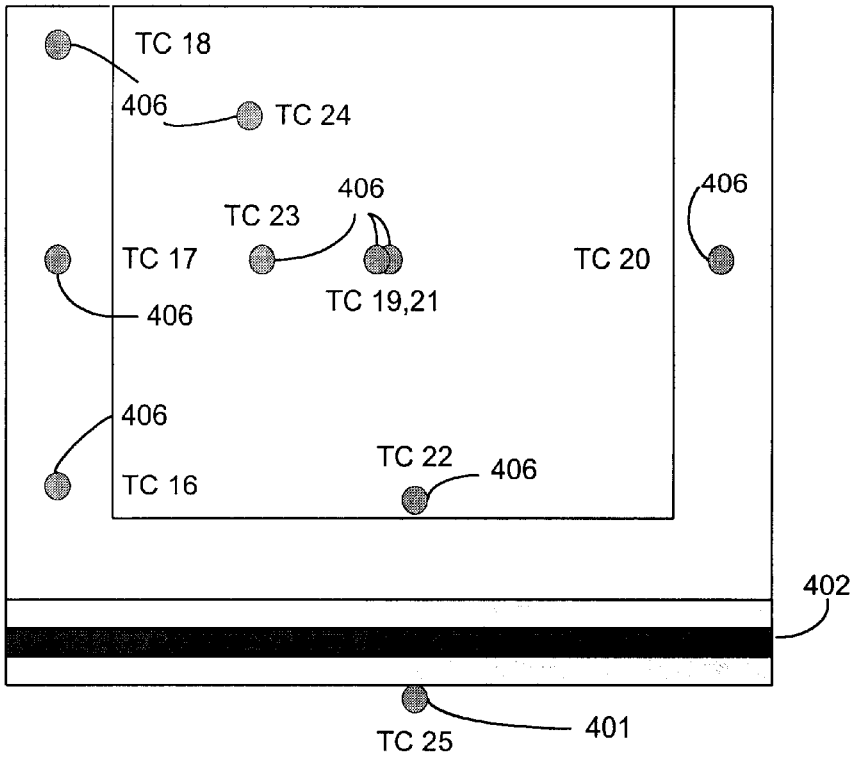
FIG. 4B depicts locations of external thermocouples used in a flame test of a container protected by a preferred embodiment of the present invention.
Figure 5:
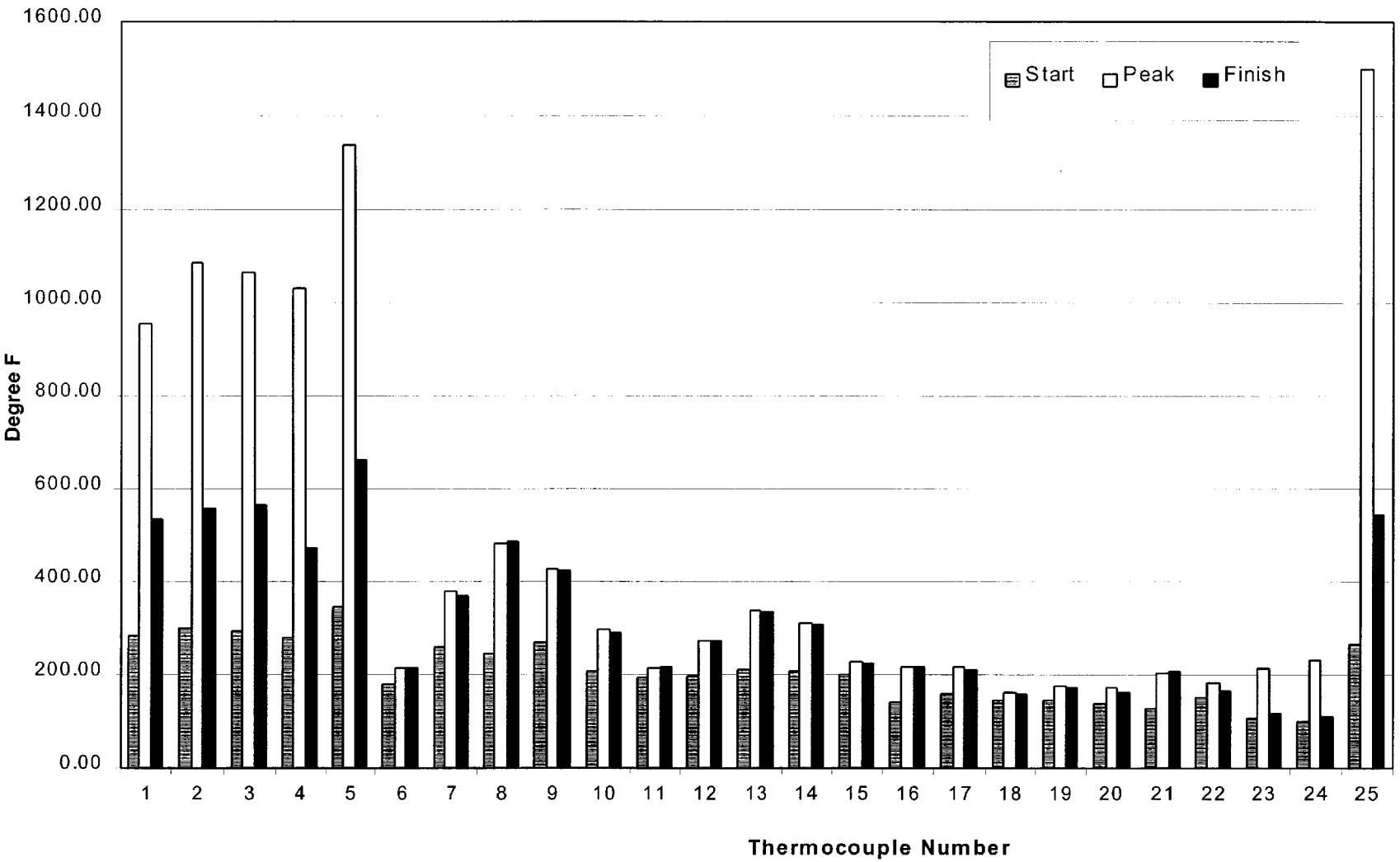
FIG. 5 is a graph of flame test results from the thermocouples depicted in FIGS. 4A and 4B.

Additional testing confirmed that an embodiment of the present invention works as a thermal barrier for a container protected by an embodiment of the present invention. A canister was placed on a grill much like a barbecue grill available at a public picnic grounds. A fire was initiated under the grill and allowed to burn out. Thermocouples were placed within the canister at various locations, from very near the source of the flames at the bottom of the canister to the very center and top of the canister. See FIG. 4A for a representation of a top view of the test setup and FIG. 4B for identification and placement of the thermocouples from a side view, the surface comprising a preferred embodiment of the present invention as a thermal barrier for a container. Test results are presented in FIG. 5. Thermocouple TC25 401 placed on the bottom of the grill rack 402 started at about 275° F. (120° C.), peaked at about 1500° F. (815° C.), and was at about 560° F. (295° C.) at the conclusion of the test. Thermocouples TC1–TC5 403 had similar measurements to TC25 401, as they were placed within the thermal barrier itself at each of the bottom four corners and within the center of the barrier's bottom layer. Thermocouples TC6–TC10 404, placed one inch inside the canister at its bottom on the four corners and in the middle, exhibited the greatest heating inside the canister, peaking at about 430° F. (220° C.) for TC8 404 and at only about 200° F. (95° C.) for TC6 404. Of the remaining thermocouples, only TC's -12, -13, and -14 405 approached a peak temperature of 300° F. (150° C.), being somewhat further away from the canister's bottom than TC's -6–-10 404. Thermocouples TC16–24 406, placed on the sides of the outside of the container, but within the barrier exhibited the least amount of heating on average, with peaks and starting temperatures staying at or below about 210° F. (100° C.). This indicates that the pumice barrier on the bottom of the canister was sufficient to prevent heating of the canister outside's side surfaces displaced even a short distance from the bottom that was subjected to direct flames.

Figure 6:
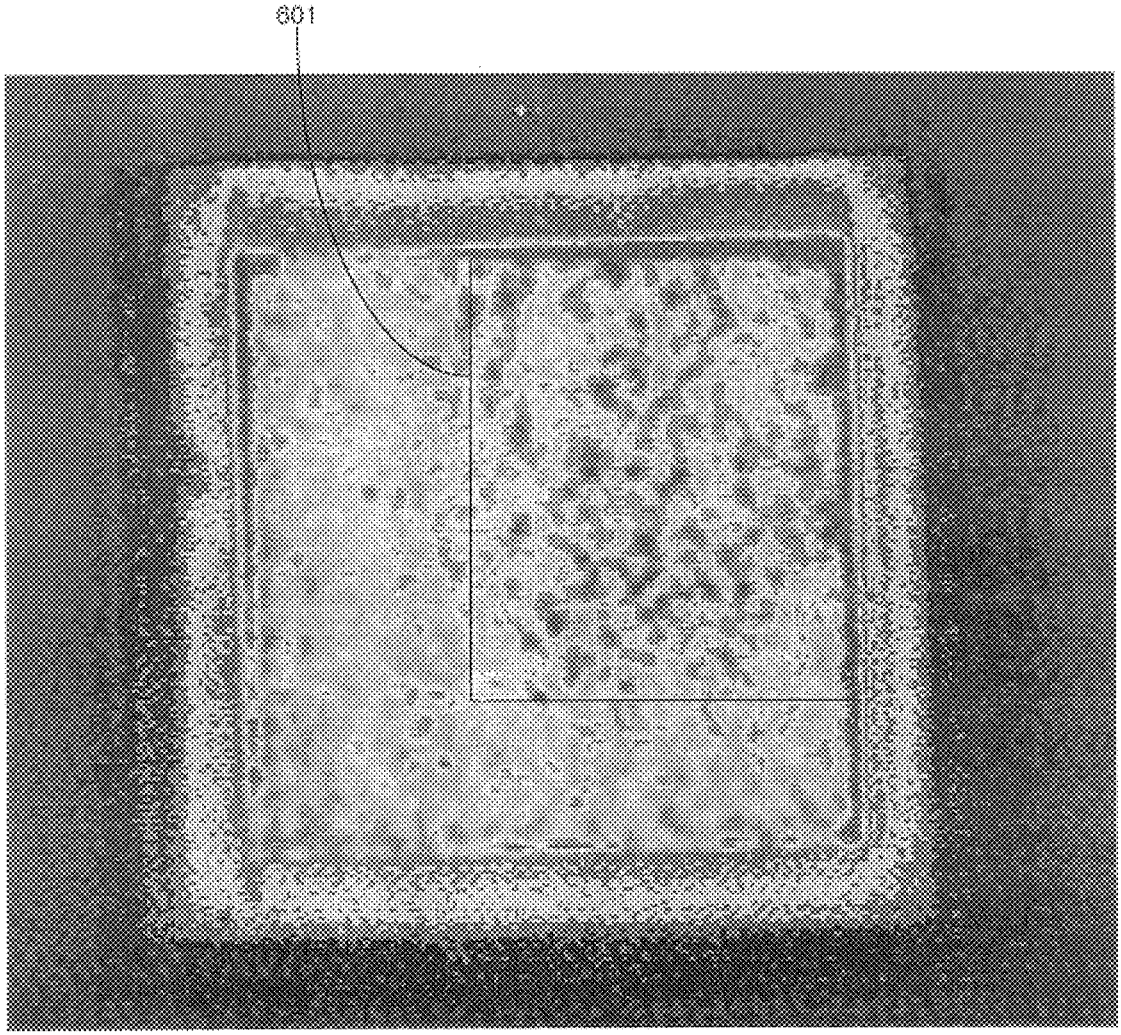
FIG. 6 depicts a representation of an IR signature of an object coated with a preferred embodiment of the present invention.

A third test was conducted of a preferred embodiment of the present invention used as a coating for purposes of IR shielding. A 12"×12"×1" slab representing a thick pumice or pumice-like aggregate coating of a preferred embodiment of the present invention was subjected to heating on one side. The slab was fabricated in the same manner as the 12"×12"×4" block above. FIG. 6 is a representation of an IR signature of the plate taken after heating the slab on one side to about 360° C. The dark splotches in the top right quadrant 601 indicate "hot spots" that translate to a peak temperature of about 90° C. This demonstrates that a thick coating of an aggregate mixture containing a pumice or pumice-like material, as in a preferred embodiment of the present invention, reduces IR signature by a factor of four.

The above descriptions should not be construed as limiting the scope of the invention but as mere illustrations of preferred embodiments. For example, although examples discussed above pertain mainly to construction, the use of a preferred embodiment of the present invention in other applications, such as refractory devices, commercial ovens, and the like, is not precluded. The scope shall be determined by appended claims as interpreted in light of the above specification.

We claim:

1. A thermal barrier composition, comprising:

particles of pumice and of a size within a uniform range; and a binder for joining said particles;

wherein said binder, thinly covering said particles, joins said particles for use as the thermal barrier, and wherein said particles comprise from about 85–99.5 weight percent of the barrier, and said binder comprises from about fifteen to one-half weight percent of the barrier.

2. The barrier of claim 1 wherein said binder is spread in a thickness of from about 0.1–1.0 mm.

3. The barrier of claim 1 wherein said barrier is a structural member.

4. The barrier of claim 3 wherein said structural member is selected from the group consisting of a wall, a door, a floor, a ceiling, and a roof.

5. The barrier of claim 1 incorporating a reinforcing material.

6. The barrier of claim 1 wherein said barrier is a coating.

7. The barrier of claim 6 wherein said coating is a coating of about 0.125 cm–3.5 cm thickness, wherein said coating may be applied in multiple layers.

8. The barrier of claim 6 wherein said coating may be applied by any of the methods selected from the group consisting of: spraying, rolling, brushing, troweling, and stuccoing.

9. The barrier of claim 6 wherein additional adhesives or agents are incorporated in said barrier to facilitate the application and durability of said coating.

10. The barrier of claim 1 wherein said binder is selected from the group consisting of: an epoxy, a two-part epoxy, a plaster, a cementitious binder, a polymeric binder, and a resin.

11. The barrier of claim 1 wherein said binder is a two-part epoxy.

12. The barrier of claim 1 wherein said particles are sized from about 0.125 cm–3.5 cm in the longest dimension of said particles.

13. The barrier of claim 1 wherein said particles are sized from about 0.5 cm–1.0 cm in the longest dimension of said particles.

14. An enclosed structure, having structural components comprising:

particles of pumice of a uniform range of sizes; and a binder for joining said particles;

wherein said binder, spread thinly over said particles, joins said particles as a mixture for use as a thermal barrier, and wherein said particles comprise from about 85 to 99.5 weight percent of said mixture, and said binder comprises from about fifteen to one-half weight percent of said mixture.

15. The structure of claim 14 wherein said binder is spread in a thickness of from about 0.1–1.0 mm.

16. The enclosed structure of claim 14 wherein said binder is selected from the group consisting of: an epoxy, a two-part epoxy, a plaster, a cementitious binder, a polymeric binder, and a resin.

17. The enclosed structure of claim 14 wherein said binder is a two-part epoxy.

18. The enclosed structure of claim 14 wherein said particles having a uniform range of sizes are sized from about 0.125 cm–3.5 cm in the longest dimension of said particles.

19. The enclosed structure of claim 14 wherein said particles having a uniform range of sizes are sized from about 0.50 cm –1.0 cm in the longest dimension of said particles.

20. The enclosed structure of claim 14 wherein said structural components include a reinforcing material.

* * * * *